(No Model.) 5 Sheets—Sheet 1.
J. HERRAN Y BOLADO.
TYPE WRITING MACHINE.
No. 506,816. Patented Oct. 17, 1893.
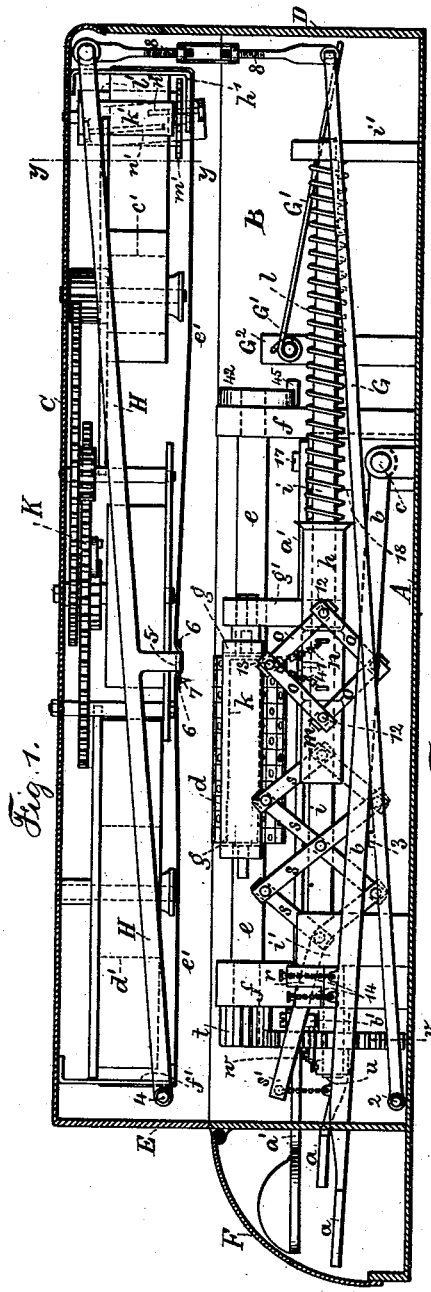
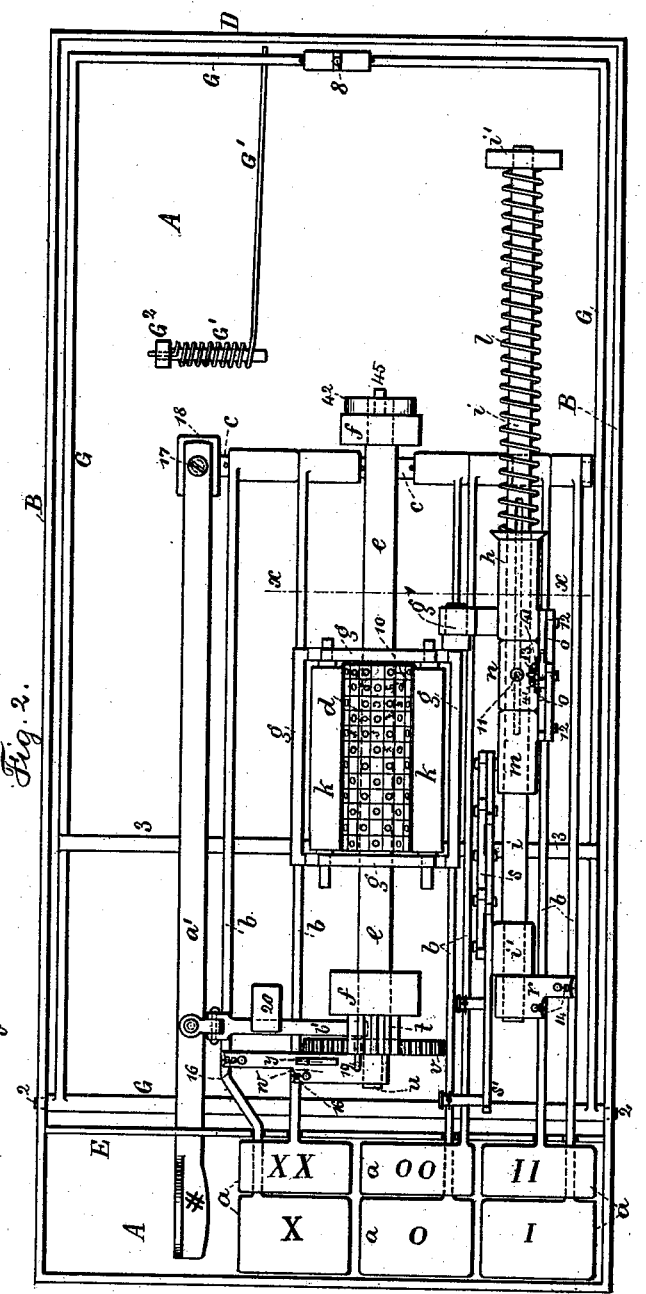

(No Model.) 5 Sheets—Sheet 2.
J. HERRAN Y BOLADO.
TYPE WRITING MACHINE.
No. 506,816. Patented Oct. 17, 1893.
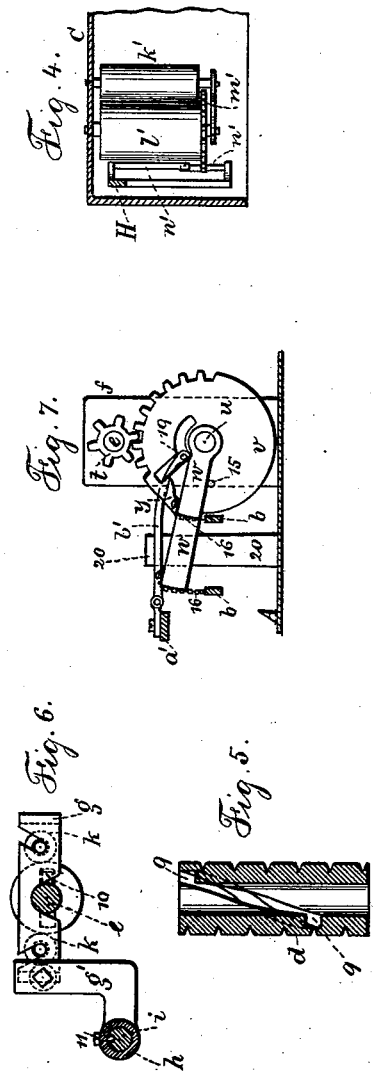
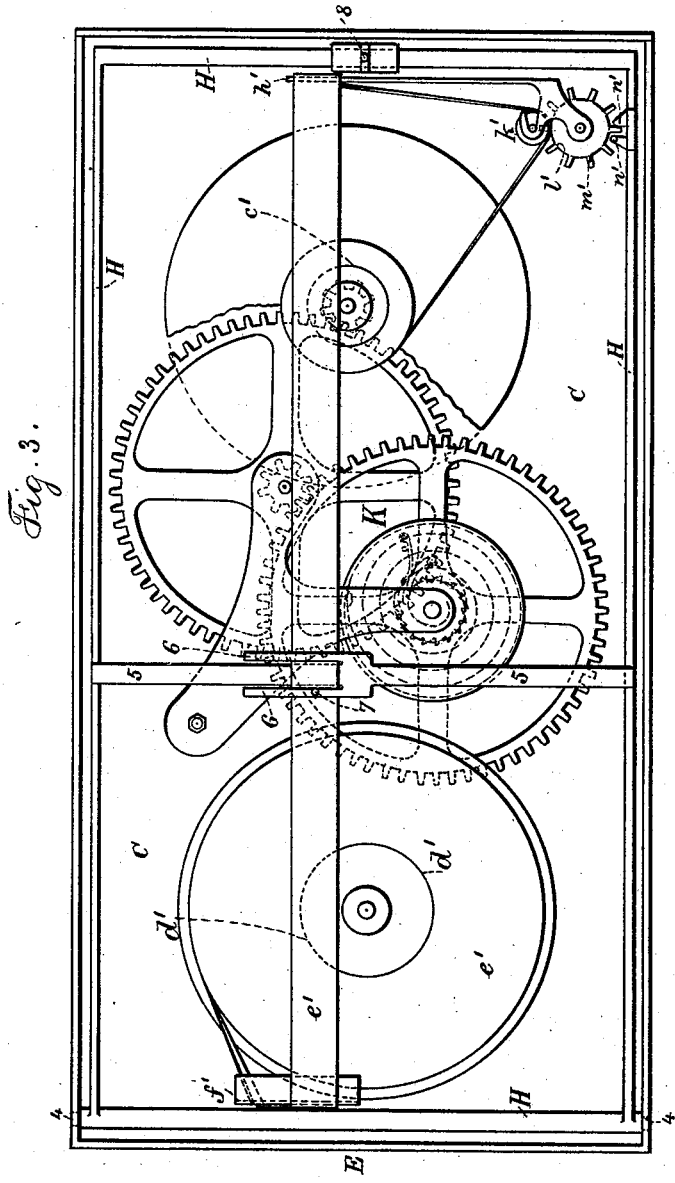
Witnesses:
J. Stail
Chas H. Smith
Inventor:
Jose Herran y Bolado
per Lemuel W. Serrell att'y (No Model.)  5 Sheets—Sheet 3.
J. HERRAN Y BOLADO.
TYPE WRITING MACHINE.
No. 506,816.  Patented Oct. 17, 1893.
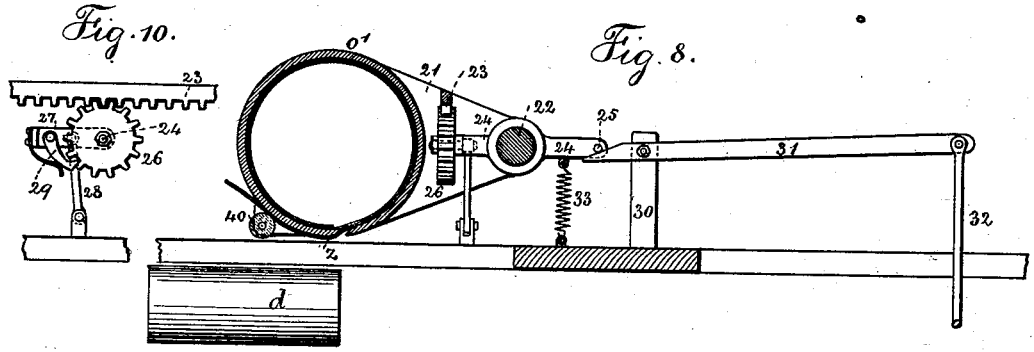
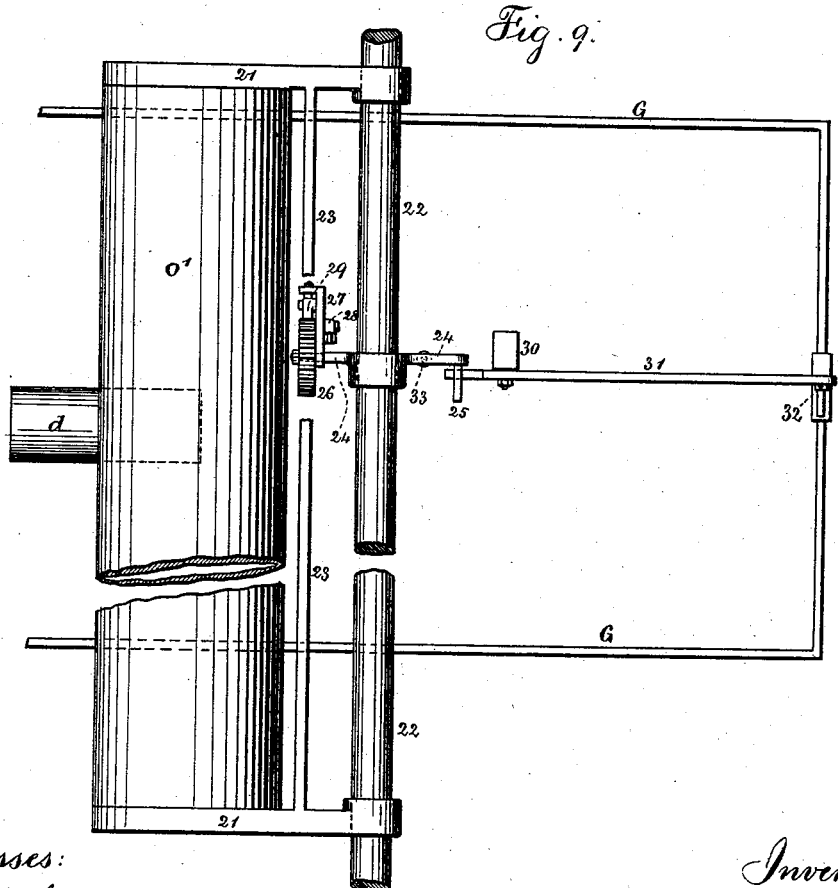
Witnesses:
J. Staib
Chas. H. Smith
Inventor:
Jose Herran y Bolado
per Lemuel W. Serrell Atty.

(No Model.)  
5 Sheets—Sheet 4.

J. HERRAN Y BOLADO.  
TYPE WRITING MACHINE.

No. 506,816.  
Patented Oct. 17, 1893.

Fig. 11.

| Key Signs | Letters | Lever | Key Signs | Letters | Lever |
|---|---|---|---|---|---|
| X | a | ! | OO.XX.II. | l | ξ |
| O | e | ○ | X.OO. | m | & |
| I | i | ? | X.OO.II. | n | 9 |
| O.X. | o | 8 | XX.I. | p | ; |
| X.I. | u | 1 | OO.I. | q | / |
| O.I. | b | " | XX.OO.I. | r | : |
| O.X.I. | c | 5 | X.OO.I. | s | 7 |
| X.X. | d | 2 | O.XX. | t | 3 |
| O.O. | f | . | X.II. | v | , |
| I.I. | g | — | O.II. | w | ñ |
| OO.XX. | h | ( | X.O.II. | x | ⌒ |
| XX.II. | j | ) | O.XX.II. | y | ...... |
| OO.II. | k | 4 | XX.O.I. | z | 6 |

Witnesses:  
J. Staib  
Chs. H. Smith

Inventor:  
Jose Herran y Bolado  
per Lemuel W. Serrell  
atty.

(No Model.) 5 Sheets—Sheet 5.
J. HERRAN Y BOLADO.
TYPE WRITING MACHINE.
No. 506,816. Patented Oct. 17, 1893.
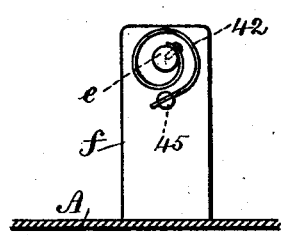
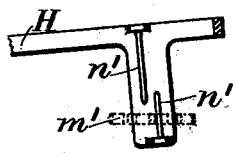
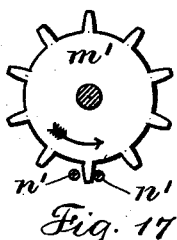
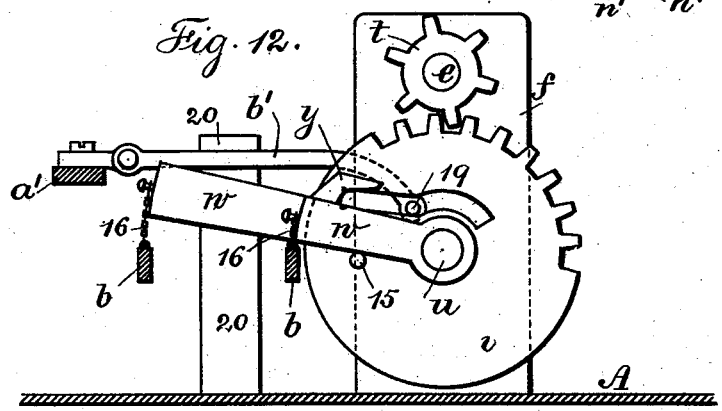
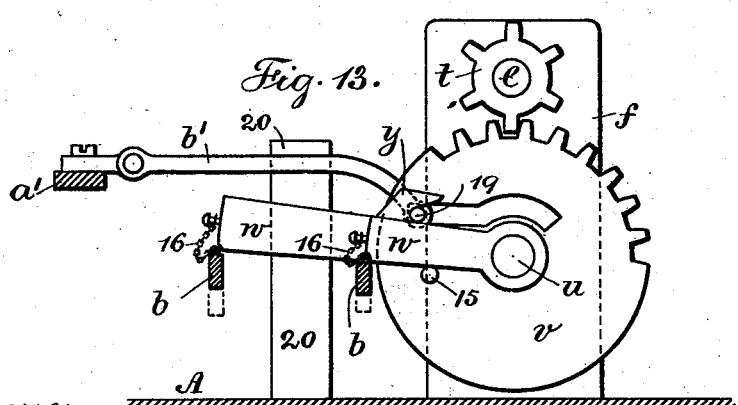

UNITED STATES PATENT OFFICE.

JOSE HERRAN Y BOLADO, OF AGUAS CALIENTES, MEXICO.

TYPE-WRITING MACHINE.

SPECIFICATION forming part of Letters Patent No. 506,816, dated October 17, 1893.

Application filed June 19, 1889. Renewed February 2, 1893. Serial No. 460,786. (No model.)

*To all whom it may concern:*

Be it known that I, JOSE HERRAN Y BOLADO, of Aguas Calientes, Mexico, have invented a new and useful Improvement in Type-Writing Machines; and the following is declared to be a full, clear, and exact description of the same.

The object of my invention is to construct a type-writer that is compact and occupies but a small space, and in which there is a minimum number of parts with only a few keys, and which machine shall be capable of printing upon an endless paper ribbon or tape or in a slightly modified form upon a sheet of paper.

In carrying out my invention I employ a revolving longitudinally moving cylinder upon the surface of which the type and characters are formed. I also employ keys and operating levers connected therewith, and mechanism connecting the levers with the type cylinder whereby the type cylinder is revolved and moved endwise, the keys being operated both singly and in groups of two or more simultaneously, so as to present the desired letters or characters beneath the place at which the impression is given, and I employ a printing mechanism operated by the levers of the keys to give the impression immediately after the shifting of the type cylinder, and mechanism for carrying and for progressively feeding along the paper ribbon or sheet with each letter printed.

In the drawings Figure 1 is a vertical longitudinal section of the case of the machine, the operating mechanism being in elevation. Fig. 2 is a plan view of the type cylinder keys and operating mechanism, with the printing device removed. Fig. 3 is an inverted plan of the mechanism for carrying and feeding the paper ribbon, the same mechanism being shown in Fig. 1 by a side elevation. Fig. 4 is an elevation and partial section at the line $y$ $y$ Fig. 1 of mechanism for progressively feeding the paper ribbon. Fig. 5 is a sectional plan of the type cylinder showing the internal spiral groove. Fig. 6 is a sectional elevation at the line $x$ $x$ of Fig. 2. Fig. 7 is an elevation of the mechanism operated by the shifting lever hereinafter described. Fig. 8 is a cross section of the printing mechanism used with a sheet of paper. Fig. 9 is a plan of the same, and Fig. 10 is an elevation of the mechanism for moving the cylinder of Figs. 8 and 9 endwise and Fig. 11 is a diagram of letters, characters, and signs, to illustrate the working of the machine. Figs. 12 and 13 are elevations of the mechanism operated by the shifting lever similar to Fig. 7, but of exaggerated size and more correct form and showing the two positions of the parts. Fig. 14 is an end elevation of the type cylinder shaft and its operative spring, and Figs. 15, 16 and 17 are detailed views of the escapement.

The description of the parts of my improved type-writer is as follows: In the containing case, A represents the bottom, B the sides, C the top, D the back, E the front, and F the front swinging lid which is to be thrown up to expose the keys of the machine. This case may be wood or metal or any other similar desirable material, and I prefer to make said case separable longitudinally about mid-way of its depth. There is a frame G within the lower portion of the case, pivoted at 2 and having a cross bar at 3 and there is a helical spring G' connected to the standard G² and the outer end of this arm passes beneath the frame G and acts to keep the back end of the said frame in an elevated position. In the upper part of the case there is a similarly shaped frame H pivoted in the case at 4 and this frame is provided with a cross bar 5 at the central portion of which are tongues 6 on one of which tongues is a projection or pin 7. These frames G and H are connected together by pivoted adjusting rods 8 so that the movement of one affects the other. The keys $a$ of the type machine have levers $b$ connected with them, which levers pass through slots in the front of the case and have hubs at their back ends where they are pivoted to the bar $c$.

The type cylinder $d$ is mounted upon the shaft $e$ which shaft is supported by standards $f$. This type cylinder has upon its face types or characters with alternate perforations which perforations are of a size adapted to receive the pin 7. This type cylinder $d$ is internally spirally grooved at 9 and there are one or more pins 10 on the shaft $e$ fitting in this groove. There is a frame $g$ slotted and fitting over the shaft $e$ and an arm $g'$ connected therewith and to a hub $h$ which surrounds the shaft $i$ and in grooves in this frame $g$ there are inking rollers $k$ whose surfaces are in contact with the type cylinder to ink the same. I provide a spiral spring 42 one end of which is connected to the shaft $e$ and the other end to a post 45. The shaft $i$ is supported at its ends by standards $i'$ and between the hub $h$ and one standard $i'$ there is a helical spring $l$ surrounding the shaft $i$, the office of which spring is to return the parts to their normal position. There are hubs $m$ $n$ also surrounding the shaft $i$, the hub $m$ being loose upon the shaft and the hub $n$ having a pin 11 which passes through a slot in said shaft whereby the shaft and hub $n$ are caused to rotate together. There are lever arms $o$ pivoted together in the form of a quadrangle, two pivots 12 of which are connected to the hubs $m$ and $h$ respectively, and two small chains pass from the upper pivot at 13 down to and connected with the hub $n$.

On the end of the shaft $i$ there is a double rocker arm $r$ from the ends of which hang small chains 14 connected respectively to two levers $b$ of keys $a$. There is a system of lever arms $s$ pivoted to one standard $i'$ and to the hub $m$ respectively, one arm of which lever at $s'$ has depending from it small chains which are connected to two other of the levers $b$ of the keys $a$.

On the one end of the shaft $e$ is a pinion $t$ and pivoted in the standard $f$ below said pinion is a short shaft $u$ and mounted upon said shaft $u$ is a toothed disk $v$ which disk is slotted and provided with a pin 15 and also mounted upon the shaft $u$ is a double rocker arm $w$ from the ends of which hang chains 16 which connect said rocker arms to two other of the levers $b$ of the keys $a$ and upon the upper surface of said rocker arm $w$ there is an undercut block or catch $y$ and said rocker arm $w$ rests on the pin 15 in its normal position. The push lever $a'$ is pivoted at 17 upon the standard 18 and the same has a horizontal or side-wise movement and there is a pivoted arm $b'$ connected to the lever $a'$ and a pin 19 upon the end of the arm $b'$ which pin passes through the slot in the disk $v$ and projects beyond the same and is adapted to engage beneath the catch $y$. This arm $b'$ passes beneath, and its upward movement is prevented, by the upper end of standard 20.

The lever $a'$ is marked ⌗ and the various keys $a$ are marked X. O. I. and XX. OO. II. This is done for the convenience of illustrating the manner in which the keys are operated singly or in groups according to the table shown in Fig. 11.

The device illustrated in Fig. 3 consists of a clock work mechanism K which is of any usual or desired construction adapted to be wound up with a spring and be geared up to drive the pinion upon the arbor of the drum $c'$ and there is a drum $d'$ upon which a ribbon or strip $e'$ of paper is wound and the same passes around a turning plate $f'$ and thence across to the turning plate $h'$ and said ribbon intermediately passes over the arms 6 and beneath the bar 5. This ribbon $e'$ passes around the turning plate $h'$ and away to and between the rollers $k'$ $l'$ and thence to the hub of the drum $c'$ which being the power drum operates to draw the paper between the rollers around the turning plates away from the drum $d'$. This feeding movement of the ribbon or strip $e'$ is governed by an escapement consisting of the toothed wheel $m'$ at the base of the roller $l'$, and the oppositely positioned rods $n'$ connected to the vertically moving frame H. Figs. 15, 16 and 17 show by an elevation and inverted plan views the construction of the escapement. A constant tension is exerted on the ribbon $e'$ by the power drum $c'$ to draw said ribbon along and rotate the roller $l'$ and wheel $m'$, and said movement is arrested by the rods $n'$ $n'$. These rods engage the teeth of the wheel $m'$ a tooth at a time and as the frame H is moved up and down one of these rods $n'$ is disengaged from a tooth and the other engaged, and as seen in Fig. 16 one tooth of $m'$ is between the two rods $n'$ at one movement and at the next movement the two rods $n'$ are between two teeth of $m'$ and thus a step by step motion is imparted to the toothed wheel $m'$ and roller $l'$, permitting the ribbon of paper to be wound upon the power drum $c'$.

The device illustrated in Figs. 8, 9 and 10 for printing upon a sheet of paper consists of a hollow cylinder $o'$ connected by arms 21 to the slide rod 22 and there is a rack bar 23 between the arms 21 which is toothed along its under edge. There is a rocker arm 24 upon the slide rod 22 one end of which has a pin 25 and upon the other end is a toothed wheel 26 and an arm 27, and this arm 27 is connected by a link 28 to the case of the machine and said arm carries a swinging pawl 29 which pawl engages the teeth of the wheel 26, said wheel 26 also meshing with the teeth of the rack bar 23. The standard 30 carries the arm 31 which arm is connected by the link 32 to the pivoted frame G in the lower part of the case of the machine, the short end of this arm 31 coming beneath the pin 25 there being a helical spring 33 from the rocker arm 24 to the case of the machine.

The operation of the machine is as follows, in the description of which the keys will be known by the signs they carry, which signs according to the table in Fig. 11 will indicate the letter to be printed. These keys are to be used singly or in groups of two or three either in conjunction with or without the lever ⌗. If the key I is depressed with its lever $b$ the rocker arm $r$ will be swung and the shaft $i$ given a partial rotation, the hub $n$ will be revolved simultaneously and the lever arms $o$ by the chains 41 will be partially closed and this movement, because the hub $m$ remains stationary, will move the hub $h$ the arm $g'$ and the type cylinder along, compressing the spring $l$ and this movement will by means of the spiral groove of the type cylinder revolve the same and bring the desired letter or character into place beneath the bar 5 where the impression is to be given. Simultaneously with the downward movement of the key I and its lever the frame G is moved downward by the lever b resting upon the cross bar 3 and as the frame G descends the frame H descends with it and the impression is given upon the paper ribbon e', the pin 7 as the parts descend entering the opening in the type cylinder and insuring the location of the desired letter. A similar operation is effected when the key II. is depressed except that the type cylinder is moved to a greater extent because of the short rocker arm with which its chain is connected. When either of the keys O. or OO. are operated with their levers b the system of lever arms s s' is operated to shift the hubs m n and h lengthwise upon the shaft i to a greater or less extent according to the movement produced by the chains that connect the levers b of these keys to the lever arms s s'. The degree of longitudinal movement of these hubs and the type cylinder which is moved thereby will bring the desired letter or character into the proper position for printing. The keys I., II., O., and OO., all act to move the type cylinder longitudinally to a greater or less extent and simultaneously cause the cylinder to rotate because the pin 10, is stationary and the cylinder internally grooved spirally. When either of the keys X. or XX. is depressed with their levers b the rocker arm w is drawn down and the disk v and pinion t are revolved and with said pinion the shaft e, the pin 10 of the shaft working in the slot of the type cylinder will cause the same to revolve, to bring the desired letter into the proper place for printing, this movement being greater with the key XX. than with the key X. During this movement the spiral spring 42 will be partially wound up and upon the release of the parts the unwinding of this spring will return the cylinder to its normal position. The arm b' moves beneath the upper projecting or overhanging portion of the post 20, consequently it has a horizontal and downward but not upward movement. When the lever a' marked ※ is actuated and moved to one side to change the case of type, said lever draws with it the arm b' and its pin 19, and as said arm b' is operated and the pin 19 is moved in the irregular slot of the disk v a partial rotary movement will be given said disk by the pin 19 bearing upon the base of the slot because the arm b' cannot move upwardly, and the rocker arm w is also depressed simultaneously to an equal extent so that the stud 15 is still in contact with the said rocker arm. As the pin 19 is moved along to the end of the slot of the disk v it passes beneath and engages the stop y. With this movement the type cylinder will be shifted in a modified position where it is possible to bring into position a letter or character to be printed in a different case or set of characters. Fig. 13 illustrates this modified position and in which if any of the keys or their combinations are operated as herein described they will cause the type cylinder to rotate to bring the letters or characters of other cases into position. In Fig. 13 the chains 16 are shown as slack and the levers b b are in the same position as in Fig. 12 but the dotted position of said levers shows at what point this slack will be taken up, and from this dotted position downward toward the bottom plate A it is possible to move these levers b to such an extent as to rotate the disk and type cylinder as required. Figs. 12 and 13 showing these features are of larger size, and they more accurately and clearly show the operation and parts than is the case with Fig. 7.

From the foregoing description it will be readily understood that if the keys X. O. II. and the keys XX. O. I. or the keys X. OO. I. or any other group or combination of these keys are operated simultaneously that their mechanism will cause the type cylinder to move to different positions and expose different letters or characters, and that these positions will be again varied if the lever ※ be operated and held while these groups of keys are being played upon.

Because of the compactness of my improved type writing machine, and its circumscribed limits it will not be possible to place an alphabet of capital letters upon the type cylinder and in order to supply the place of such capital letters and to designate which letters are to be considered capitals I make use of a peculiar sign which is to be printed preceding the letter to be designated as a capital. This sign is shown in the diagram Fig. 11 and the same is brought to place and printed by the operation of the lever ※ and simultaneous operation of the finger keys OO. XX. II. after which the first letter of a desired word is printed in the usual manner.

The device illustrated in Figs. 8, 9 and 10 is adapted to be used with the type cylinder, keys and their attendant mechanism, and it replaces the clock work mechanism and device for carrying the paper ribbon, in which case a sheet of paper will be printed upon at the place designated by z, the sheet of paper being wound up and contained within the hollow cylinder o' and its end projecting through the slot in the lower part of said cylinder and passing between the cylinder and the roller 40 which roller 40 may be operated in any desired manner to impart a step by step feed motion to the sheet of paper. This cylinder o' in its normal position is held above the type cylinder and when the arm G and link 32 are depressed by the key levers, the arm 31 presses upon the under side of the pin 25 and swings the rocker arm 24 against the power of the spring 33 and thereby depresses the cylinder o' to give the impression. As this movement takes place and the toothed wheel 26 descends the arm 27 swings upon the pivot of the link 28 and its outer end rises lifting the pawl 29 so that the same engages another tooth of the wheel 26. As the parts are released after printing, the spring 33 raises the cylinder o' and the wheel 26. This lifting action gives the wheel 26 a partial rotation because of the reverse movement of the parts and the engaging of the pawl, and this acts to carry along the rack 23 the distance of a tooth and with it the cylinder o' one step farther for the next letter to be printed.

My improved type writing machine is illustrated about full size in the drawings, and the same is compact and can easily be carried about with a person who may be traveling and the same does not easily get out of order and said machine is a desirable article.

I claim as my invention—

1. In a type writing machine, the combination with keys $a$ and their pivoted levers $b$, of a pivoted frame G a cross bar 3 connected therewith, a spring and arm G' a pivoted frame H a cross bar 5 beneath which the paper to be printed passes and a connection between the pivoted arms, substantially as set forth.

2. In a type writing machine, the combination with keys $a$ and their pivoted levers $b$, of the type cylinder, an arm and frame for operating the same, the shaft $i$ the hubs $m$ $n$ and $h$, the spring $l$ the lever arms $o$ and rocker arms $r$ and their chains substantially as set forth.

3. In a type writing machine, the combination with the keys $a$ and their pivoted levers $b$, of the type cylinder, a frame and arm for inclosing and moving the same, the shaft $i$, hubs $m$ $n$ and $h$ and spring $l$ the lever arms $s$ $s'$ and their chains, substantially as and for the purposes set forth.

4. In a type writing machine, the combination with keys $a$ and their pivoted arms $b$, of the shaft $e$ the pinion $t$ the toothed disk $v$ the rocker arms $w$ and their chains, the type cylinder and mechanism substantially as specified for rotating the type cylinder, substantially as set forth.

5. In a type writing machine, the combination with keys $a$ and their pivoted levers $b$, of the type cylinder $d$ internally grooved at 9 and having letters and characters and alternately placed perforations upon its surface and with mechanism substantially as herein shown and described for revolving and longitudinally moving said type cylinder, substantially as set forth.

6. In a type writing machine the combination with keys $a$ and their pivoted levers $b$, of the type cylinder $d$ a shaft $e$ the pinion $t$ the slotted toothed disk $v$ the shaft $u$ and rocking lever $w$, catch $y$, the pivoted lever $a'$ and its arm $b'$ and pinion 19 whereby the position of the type cylinder can be shifted and held during the operation of one or more keys, substantially as set forth.

7. In a type writing machine, the combination with the shafts $e$ and $i$ and the type cylinder $d$, of the frame $g$ the arm $g'$ and hub $h$ and the helical spring $l$ for returning the type cylinder to its normal position, substantially as set forth.

8. In a type writing machine, the combination with keys $a$ and their pivoted levers $b$ of the pivoted frames G H and their cross bars 3, 5, the clock work mechanism K and the drums $c'$ $d'$ for carrying the paper ribbon or strip, and with mechanism substantially as set forth for turning the paper ribbon and for advancing and taking up the paper ribbon with a step by step motion as the printing progresses, substantially as set forth.

9. In a type writing machine the combination with keys $a$ and their pivoted levers $b$ of the pivoted frames G, H, and their cross bars 3, 5, the clock work mechanism K and the drums $c'$ $d'$ for carrying the paper ribbon or strip, the turning plates $f'$ $h'$ the fingers 6 behind which the paper ribbon is received, the rollers $k'$ $l'$ the toothed wheel $m'$ and the rods $n'$ connected to the pivoted frame H and forming an escapement mechanism, whereby a step by step motion is imparted to the paper, substantially as set forth.

10. In a type writing machine, the combination with keys $a$ and their pivoted levers $b$, of the type cylinder $d$ having upon its face types and characters and alternately placed perforations and an interior spiral groove at 9, the shaft $e$ having a pin at 10, a pin at 7 upon the printing mechanism adapted to engage the perforations of the type cylinder, and mechanism substantially as shown and described connected with the impression mechanism and operated by the depression of the key levers to cause the impression mechanism to operate, substantially as set forth.

Signed by me this 28th day of May, A. D. 1889.

JOSE HERRAN Y BOLADO.

Witnesses:
GEO. T. PINCKNEY,
HAROLD SERRELL.